(12) United States Patent
Putt et al.

(10) Patent No.: US 8,746,984 B2
(45) Date of Patent: Jun. 10, 2014

(54) MECHANISM FOR MOUNTING AND DISMOUNTING BEARING

(75) Inventors: Daniel Putt, Stevensville, MI (US); Jonathan Schultz, Valparaiso, IN (US)

(73) Assignee: Emerson Power Transmission Corporation, Florence, KY (US)

( * ) Notice: Subject to any disclaimer, the term of this patent is extended or adjusted under 35 U.S.C. 154(b) by 0 days.

(21) Appl. No.: 13/253,476

(22) Filed: Oct. 5, 2011

(65) Prior Publication Data

US 2012/0027334 A1    Feb. 2, 2012

Related U.S. Application Data

(63) Continuation of application No. 12/052,142, filed on Mar. 20, 2008, now abandoned.

(60) Provisional application No. 60/908,755, filed on Mar. 29, 2007.

(51) Int. Cl.
   *F16C 43/00* (2006.01)

(52) U.S. Cl.
   USPC ........... 384/537; 384/538; 384/584; 384/540; 384/542; 29/898.07; 29/898.08; 29/898; 29/592; 403/314; 403/374.4

(58) Field of Classification Search
   USPC .......... 29/898.07, 898.08, 898, 592; 384/538, 384/537, 584, 540; 403/314, 374.4
   See application file for complete search history.

(56) References Cited

U.S. PATENT DOCUMENTS

| | | | | |
|---|---|---|---|---|
| 2,556,151 A | * | 6/1951 | Bremer | 403/356 |
| 2,570,604 A | * | 10/1951 | Siegerist | 403/7 |
| 3,590,652 A | * | 7/1971 | Strang | 74/421 R |
| 4,452,547 A | * | 6/1984 | Thiel et al. | 403/370 |
| 4,978,236 A | | 12/1990 | Ostling | |
| 5,011,306 A | * | 4/1991 | Martinie | 384/585 |
| 5,197,345 A | * | 3/1993 | Rose | 74/421 R |
| 5,269,622 A | * | 12/1993 | Mullenberg | 403/370 |
| 5,330,284 A | * | 7/1994 | Persson | 403/370 |
| 5,489,156 A | | 2/1996 | Martinie | |
| 5,496,127 A | * | 3/1996 | Muller et al. | 403/371 |
| 5,709,483 A | | 1/1998 | Martinie | |
| 5,765,961 A | * | 6/1998 | Phillips | 403/367 |
| 7,305,767 B2 | * | 12/2007 | Nisley et al. | 29/898.08 |
| 7,344,313 B2 | | 3/2008 | Hansen et al. | |
| 7,788,786 B2 | * | 9/2010 | Hewitt et al. | 29/525.11 |
| 7,909,516 B2 | * | 3/2011 | Hewitt et al. | 384/538 |
| 8,151,465 B2 | * | 4/2012 | Hewitt | 29/898.07 |

FOREIGN PATENT DOCUMENTS

JP    2006009967 A   *  1/2006

* cited by examiner

*Primary Examiner* — Peter DungBa Vo
*Assistant Examiner* — Azm Parvez
(74) *Attorney, Agent, or Firm* — Harness, Dickey & Pierce, P.L.C.

(57) ABSTRACT

A mechanism and method for locking a bearing to a shaft includes a split sleeve and a receptive flange adapted to be fixed to the bearing. A positioning flange is coupled to the split sleeve. A screw extends through the positioning flange and threadingly engages the receptive flange. Rotation of the screw in a first direction axially drives the sleeve into engagement with the bearing to collapse the split sleeve into engagement with the shaft.

14 Claims, 5 Drawing Sheets

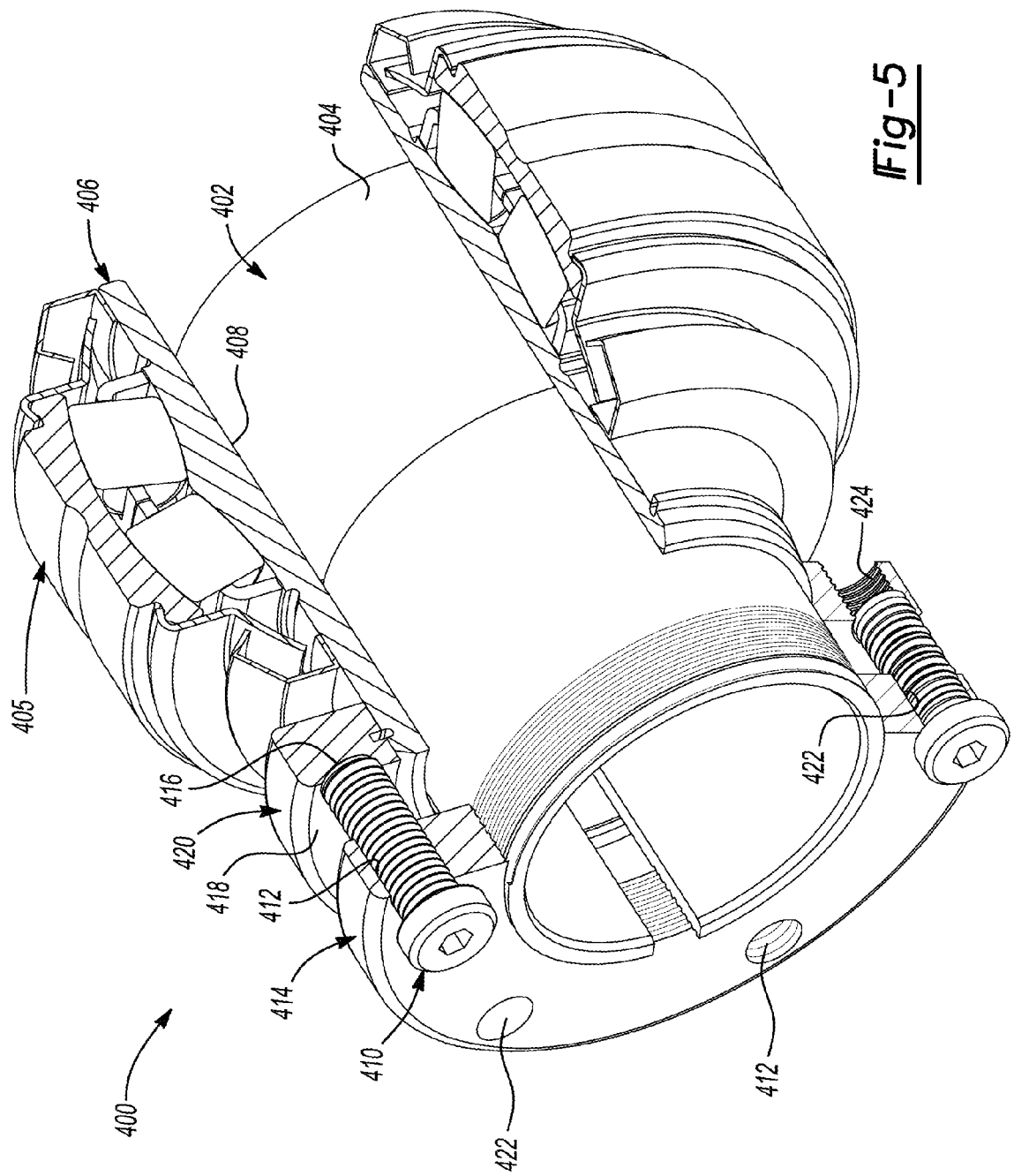

MECHANISM FOR MOUNTING AND DISMOUNTING BEARING

CROSS-REFERENCE TO RELATED APPLICATIONS

This application is a continuation of U.S. patent application Ser. No. 12/052,142 filed on Mar. 20, 2008, which claims the benefit of U.S. Provisional Application No. 60/908,755, filed on Mar. 29, 2007. The disclosures of each of the above applications are incorporated herein by reference.

FIELD

The present disclosure relates to a mechanism for mounting and dismounting a bearing to a shaft. More particularly, the present disclosure relates to a concentric locking mechanism operable to secure and remove the bearing from one side thereof.

BACKGROUND AND SUMMARY

One known bearing mounting mechanism includes a sleeve, nut, and washer locking mechanism. This design uses a sleeve with a straight bore and tapered outer surface which fits onto the shaft. One end of the sleeve outer surface has a threaded portion and there is a slit through the entire axial length of the sleeve. The bearing inner ring bore has a taper which matches the sleeve outer surface. The bearing is driven up the tapered sleeve with a nut that threads onto the tapered sleeve. This compresses the sleeve and locks the bearing to the shaft. A lockplate is then used to keep the nut from rotating and loosening from the sleeve. The bearing is dismounted by removing the lockplate, loosening the nut and driving the bearing back down the taper.

Another mechanism uses a tapered sleeve and tapered inner ring bore as described above but has a nut that is held captive to the inner ring. This design is installed by turning the nut and driving the bearing up the tapered sleeve. Once the bearing is tight, a lockplate is used to secure the nut and prevent rotation. To remove this bearing, the lockplate is removed and the nut is rotated in the opposite direction. The nut is held to the inner ring so this rotation drives the bearing down the sleeve and it becomes loose to the shaft.

Another mechanism requires the use of two tapered sleeves and an inner ring with two matching tapers. The tapers on the inner ring begin with a thin cross section at each end of the bearing, both increasing in thickness until they meet in the center of the bore. The first tapered sleeve extends through the entire bearing inner ring and contains a threaded portion on each end. The second tapered sleeve extends only to the center of the bore and slips over the extended length of the first tapered sleeve. The second tapered sleeve is held captive in the first threaded nut. For installation, the second tapered sleeve is installed over the first tapered sleeve and the first threaded nut engages the first threaded portion of the first tapered sleeve. This action pulls the first tapered sleeve into engagement with the first inner ring taper and pushes the second tapered sleeve into engagement with the second inner ring taper which compresses both sleeves causing the bearing to become tight to the shaft. At this point a screw on the first threaded nut is tightened to prevent rotation and loosening. For removal, the screw on the first threaded nut is loosened. The first threaded nut is loosened from the first tapered sleeve and the second tapered sleeve is removed from the bearing. The second captive nut is then threaded onto the second threaded portion of the first tapered sleeve which removes the first tapered sleeve from the bearing causing the bearing to become loose to the shaft.

Another mechanism uses a sleeve with a straight bore and a multiple tapered outer surface. The inner ring has a multiple tapered surface to match the sleeve. The sleeve extends from both ends of the inner ring. Each side of the bearing has a washer which rests against the end face of the inner ring. The sleeve outer diameter on both ends has a recessed slot. A flange sits inside that slot on both sides. Each flange has threaded holes containing setscrews. To install the bearing the mounting side flange is used, the setscrews are tightened which move the sleeve axially and drive the bearing up the tapered surface tightening it to the shaft. To remove the bearing, the mounting side flange is loosened and the dismounting side flange is engaged. As these setscrews are turned toward the bearing, the sleeve moves in the opposite axial direction loosening it from the shaft.

The first limitation of the prior art is obtaining the proper axial movement to tighten the bearing to the shaft while not over tightening the bearing. If the bearing is over tightened then the necessary clearance in the bearing will be reduced or removed causing decreased life. The sleeve, nut, washer and captive nut designs encounter this problem. They use the "turn of the nut" tightening method, which provides a specific amount of rotation to apply to the nut in order to obtain the proper shaft lock. This method skews the accuracy of the shaft lock because it relies on the consumer's personal judgment of a "zero point", which differs between each user. The "zero point" is often defined by the manufacturer as when the nut is "hand tight". Other manufacturers require the user to tighten until the nut is "tight", giving no quantitative value to tighten to. Both methods yield variation between installers which will cause variation in the bearing internal clearance and ability to lock the bearing to the shaft.

The other major limitation with prior solutions is the method of dismounting the bearing from the shaft. The sleeve, nut, washer assembly provides no means of removing the bearing from the shaft. To remove the bearing, the nut is loosened from the tapered sleeve and then the bearing must be driven down the sleeve. This is accomplished by hitting either the shaft or bearing with a hammer to release the sleeve from the bearing. This often does not work and the bearing must be cut off the shaft which may damage expensive shafting and can add additional machine downtime. The multiple tapered sleeve and multiple sleeve designs utilize a separate mechanism for mounting and dismounting the bearing. The dismounting mechanism is on the opposite side of the mounting mechanism. This is undesirable in many applications due to a lack of space or access to the back side of the bearing. In these applications the dismounting feature of this bearing is not usable.

It may be beneficial to incorporate a means of tightening a bearing to a shaft using a sleeve that concentrically constricts around the shaft. It may be desirable to incorporate certain design considerations such as easy installation, easy removal, minimal pieces, high strength, small size, and cost effectiveness. A need may exist for a locking mechanism that would feature some or all of these design considerations.

The disclosure provides a means to secure the bearing to a shaft. The design provides a concentric locking mechanism to minimize the amount of raceway distortion caused by the locking mechanism. This design also provides a means to secure and remove the bearing on one side of the bearing using the same set of components. The disclosure also uses a metered torque tightening approach to ensure the proper installation.

The present disclosure provides a mechanism for mounting and dismounting a bearing to a shaft. The mechanism includes a split sleeve and a receptive flange adapted to be axially fixed to the bearing. A positioning flange is coupled to the split sleeve to form a tapered bushing assembly. At least one screw extends through at least a portion of the positioning flange and the receptive flange. The screw threadingly engages one of the positioning flange and the receptive flange. Rotation of the screw in a first direction axially drives the sleeve into engagement with the bearing to collapse the split sleeve into engagement with the shaft. Rotation of the screw in a second opposite direction axially pulls the sleeve out of engagement with the bearing to return the sleeve to a more undeformed state. The sleeve is released from engagement with the shaft.

Additionally, the present disclosure provides a mechanism for locking a bearing to a shaft including a split sleeve having a radially extending flange formed at one end. The flange includes first and second bores. The second bores include internal threads. The split sleeve has a tapered surface adapted to engage the bearing. A first screw extends through the first bore and is adapted to threadingly engage the bearing. Rotation of the first screw axially drives the tapered surface into engagement with the bearing to collapse the split sleeve into engagement with the shaft. A second screw is threadingly engaged with the internal thread of the second bore and is adapted to engage the bearing. Rotation of the second screw axially drives the tapered surface out of engagement with the bearing to allow the split sleeve to be moved relative to the shaft.

A method of locking a bearing to a shaft includes coupling a positioning flange to a split sleeve. A receptive flange is coupled to the bearing. A screw is threadingly engaged with a threaded bore formed in one of the positioning flange and the receptive flange. The screw is rotated in a first direction to axially translate the split sleeve into engagement with the bearing to collapse the split sleeve into engagement with the shaft.

DRAWINGS

The drawings described herein are for illustration purposes only and are not intended to limit the scope of the present disclosure in any way.

FIG. 5 is a fragmentary perspective view of another locking mechanism.

DESCRIPTION

Figure 1:
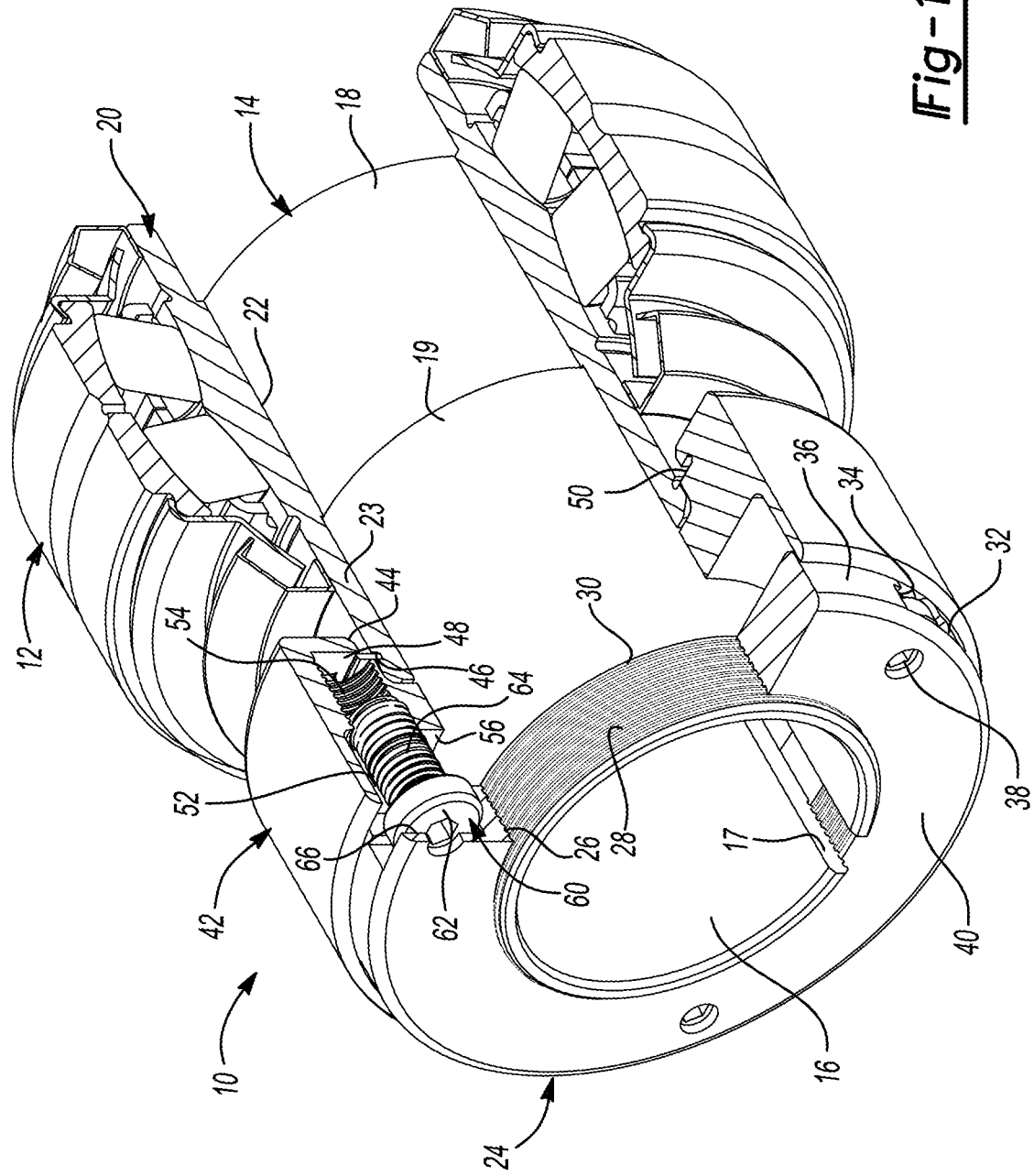
FIG. 1 is a fragmentary perspective view of a locking mechanism constructed in accordance with the teachings of the present disclosure.

FIG. 1 of the present disclosure provides a locking mechanism 10 operable to mount and dismount an exemplary bearing assembly 12 to a shaft (not shown). Locking mechanism 10 includes a split sleeve 14 with a straight bore 16, an axially extending gap 17 and a tapered outer surface 18. A portion 19 of the outer surface of split sleeve 14 is substantially cylindrically shaped. A length of split sleeve 14 is defined so that it will extend axially from one end of a bearing inner ring 20 of bearing assembly 12. Bearing inner ring 20 has a bore with a tapered surface 22 matching the tapered outer surface 18 of split sleeve 14. Inner ring 20 includes an extension portion 23 on one side which matches the extension end of split sleeve 14.

A positioning flange 24 includes a threaded bore 26. The extended portion of split sleeve 14 includes an external thread 28 terminating at a shoulder 30. Positioning flange 24 is threadingly engaged with split sleeve 14 and fixed against shoulder 30. Positioning flange 24 also includes a plurality of pockets 32 circumferentially spaced apart from one another. Each pocket is defined by a stepped slot 34 radially inwardly extending from an outer cylindrical surface 36 of positioning flange 24. An aperture 38 inwardly extends from an end face 40 in communication with stepped slot 34.

A receptive flange 42 includes a bore 44 that receives the extension portion 23 of the inner ring 20. An outer ring groove 46 is formed on extension portion 23 and an inner ring groove 48 is formed within bore 44. A snap ring 50 axially fixes receptive flange 42 to bearing inner ring 20.

Receptive flange 42 also includes a recess 52 sized to accept positioning flange 24. As such, positioning flange 24 is substantially concentrically aligned with receptive flange 42. A plurality of threaded blind bores 54 axially extend from a bottom surface 56 of recess 52. Blind bores 54 are circumferentially spaced apart along a matching pattern to pockets 32.

A screw member 60 includes an enlarged head 62 positioned within each pocket 32. A threaded shank portion 64 of screw member 60 extends through aperture 38 and threadingly engages threaded blind bore 54. Each screw member 60 acts between the positioning flange 24 and receptive flange 42 in order to affect axial movement between the inner ring 20 and split sleeve 14 in both directions. The screw members 60 are used to create axial movement of split sleeve 14 relative to the bearing inner ring 20. The movement of positioning flange 24 and split sleeve 14 is axial in direction, substantially without rotation. Each aperture 38 is sized and positioned to allow access for a tool to drivingly engage screw member 60. The screw members 60 are rotated in a first direction and tightened with a torque wrench to a specified torque value yielding a consistent, repeatable value. The forced engagement between tapered outer surface 18 and tapered surface 22 collapses split sleeve 14 and locks the bearing assembly 12 to the shaft. Split sleeve 14 may be constructed from a resilient material such as SAE 4140. Accordingly, the size of straight bore 16 is greater when split sleeve 14 is in a free state than when in an engaged state while being driven into contact with bearing inner ring 20. Other materials may also be used without departing from the scope of the present disclosure.

To dismount the bearing assembly 12, screws 60 are rotated in an opposite direction to cause enlarged heads 62 to engage a wall 66 defining a portion of pocket 32. This, in turn, causes axial movement of split sleeve 14 in the opposite direction. Disengagement of tapered outer surface 18 from tapered surface 22 allows split sleeve 14 to elastically return to a more undeformed state thereby releasing the circumferential grasp on the shaft. A loosening of the bearing assembly 12 from the shaft results.

The invention improves the customer simplicity of the installation and removal, by providing the means for installation and removal on the same side of the bearing. The invention incorporates a feature that allows the customer to mount and dismount the bearing using screws all contained on one side of the bearing. This arrangement provides a more efficient means of installation and removal. The invention also provides a qualitative method of tightening the bearing to the shafts by providing a torque value to be applied with a torque wrench. This yields a more precisely tightened bearing which ensures the proper holding force and proper bearing internal clearance.

An alternate locking mechanism 100 is substantially similar to locking mechanism 10. As such, similar elements will be identified with reference numerals including a prime suffix. Locking mechanism 100 includes a plurality of cap screws 102 extending through bores 104 formed in positioning flange 24'. Cap screws 102 are rotated in a first direction to collapse split sleeve 14' about the shaft. A predetermined torque is applied to each cap screw 102 to provide the axial translation of split sleeve 14' in relation to bearing inner ring 20' and provide the desired circumferential squeezing or clamping of split sleeve 14' about the shaft.

To dismount bearing assembly 12' from the shaft, cap screws 102 are rotated in the opposite direction to disengage them from threaded bores 54' formed in receptive flange 42'. Set screws 106 are then rotated in a first direction to place an end face 108 of each set screw 106 in engagement with a face 110 of receptive flange 42'. Set screws 106 include external threads in threading engagement with internal threads formed in positioning flange 24' such that rotation of set screws 106 causes axial translation of set screw 106 relative to positioning flange 24'. Continued rotation of each set screw 106 imparts a force on face 110 to cause split sleeve 14' to be removed from engagement with bearing inner ring 20'. As the tapered outer surface 18' of split sleeve 14' disengages from the tapered surface 22' of bearing inner ring 20', split sleeve 14' resiliently returns to a less deformed condition and disengages the shaft.

An alternate locking mechanism 200 is substantially similar to locking mechanism 10. As such, similar elements will be identified with reference numerals including a double prime suffix. Locking mechanism 200 contains a flanged split sleeve 202 with a straight bore 16", an axially extending gap 17", a tapered outer surface portion 18", a cylindrical outer surface portion 19", a plurality of holes 204 circumferentially spaced apart from one another, and a plurality of threaded holes 206 circumferentially spaced apart from one another. An inner ring 20" includes a plurality of threaded blind bores 54" axially extending from an end face 208. Blind bores 54" are circumferentially spaced apart along a matching pattern to holes 204. Locking mechanism 200 includes a plurality of cap screws 210 extending through holes 204 in flanged split sleeve 202. Cap screws 210 are rotated in a first direction to collapse flanged split sleeve 202 about the shaft. A predetermined torque is applied to each cap screw 210 to provide axial translation of flanged split sleeve 202 in relation to bearing inner ring 20" and provide the desired circumferential interference or clamping of flanged split sleeve 202 about the shaft.

To dismount bearing assembly 12" from the shaft, cap screws 210 are rotated in the opposite direction to disengage from the threaded bores 54" formed in inner ring 20". Cap screws 210 are then inserted into threaded holes 206 in flanged split sleeve 202. Cap screws 210 are then rotated in the first direction to axially translate the cap screws 210 relative to flange split sleeve 202 and engage an end 212 of each cap screw 210 with end face 208 of inner ring 20". Continued rotation of each cap screw 210 imparts a force on end face 208 to cause flanged split sleeve 202 to be removed from engagement with bearing inner ring 20". As the tapered outer surface 18" of flanged split sleeve 202 disengages from the tapered surface 22" of bearing inner ring 20", flanged split sleeve 202 resiliently returns to a less deformed condition and disengages the shaft.

Figure 4:
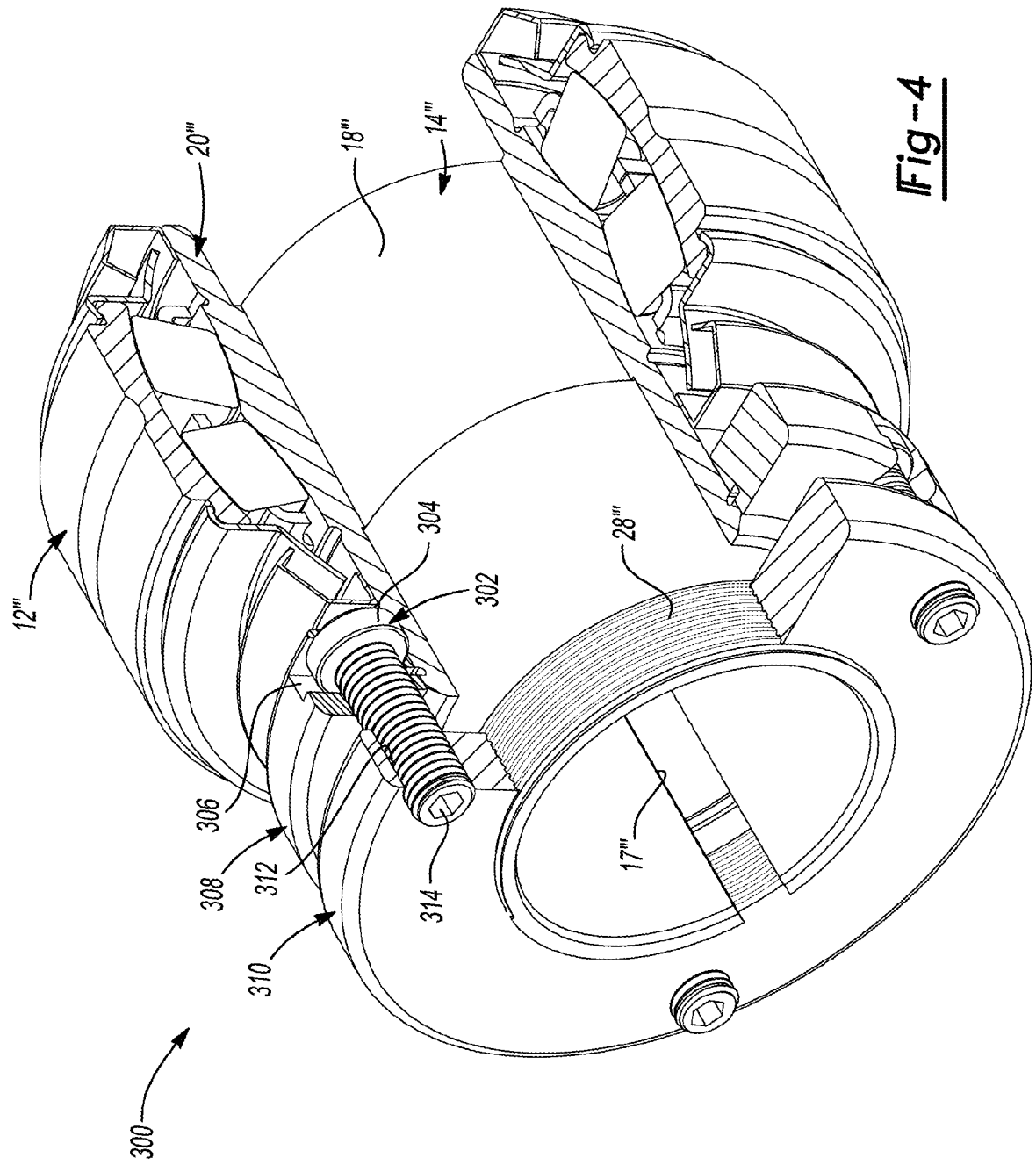
FIG. 4 is a fragmentary perspective view of another locking mechanism.

Another alternate locking mechanism 300 is depicted in FIG. 4. Locking mechanism 300 is substantially similar to locking mechanism 10. As such, similar elements will be identified with like reference numerals including a triple prime suffix. Locking mechanism 300 includes a plurality of screw members 302 each having an enlarged head 304 positioned within a pocket 306 formed within a receptive flange 308. Each screw member 302 is free to rotate but restricted from axial movement relative to receptive flange 308. A positioning flange 310 includes threaded apertures 312 in receipt of screw members 302. Each screw member 302 further includes a drive socket 314 formed on an end opposite enlarged head 304. The remaining components of locking mechanism 300 are substantially similar to those previously described in relation to locking mechanism 10. The function of locking mechanism 300 is also substantially similar to locking mechanism 10 in that rotation of screw members 302 causes relative axial movement between split sleeve 14''' and bearing inner ring 20''' causing split sleeve 14''' to lockingly engage and disengage a shaft as previously described.

Figure 2:
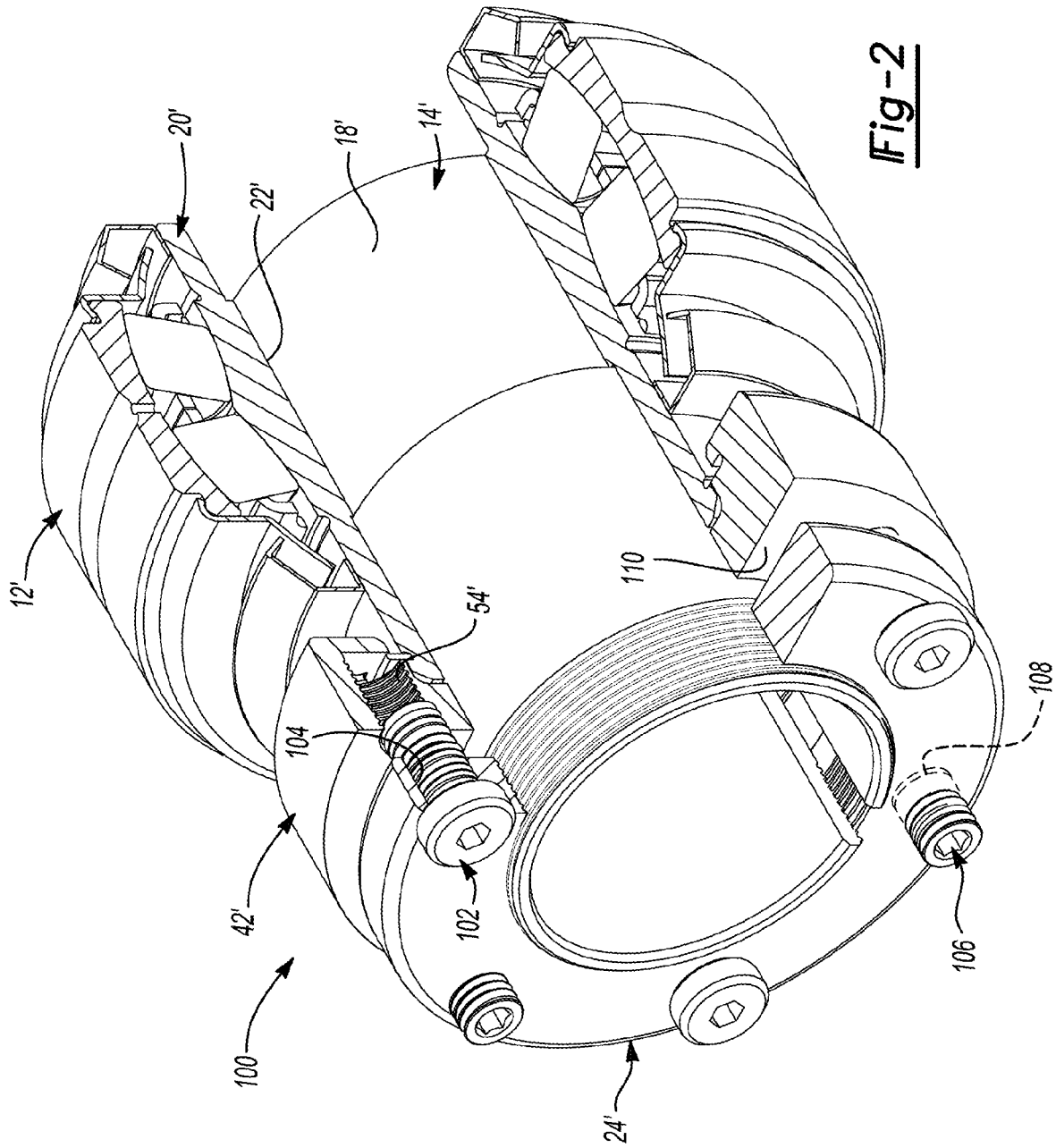
FIG. 2 is a fragmentary perspective view of another locking mechanism.
Figure 3:
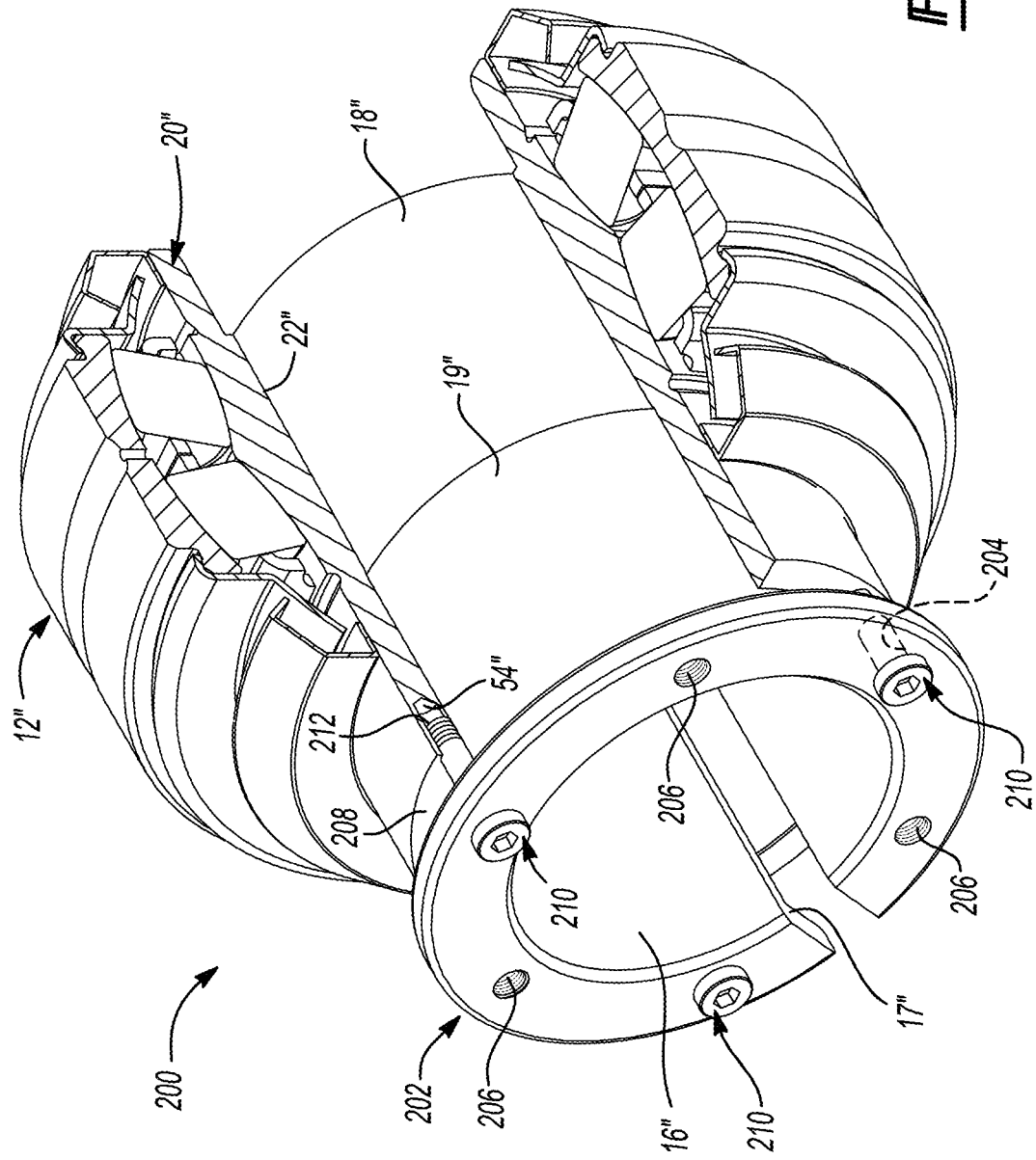
FIG. 3 is a fragmentary perspective view of another locking mechanism.

FIG. 5 depicts another locking mechanism identified at reference numeral 400. Locking mechanism 400 is substantially similar to locking mechanism 100 shown in FIG. 2. Locking mechanism 400 differs from locking mechanism 100 in that a split sleeve 402 includes a tapered outer surface 404 having a taper in the opposite direction as that of tapered outer surface 18'. A bearing 405 includes a bearing inner ring 406 having a tapered surface 408 tapered in a direction matching tapered outer surface 404. Accordingly, the direction of taper formed on tapered surface 408 is in the opposite direction as tapered surface 22'. By changing the direction of the tapers, a reduction in split sleeve diameter is achieved by pulling split sleeve 402 through bearing inner ring 406. Split sleeve 402 may be driven into contact and clamped about a shaft by positioning cap screws 410 within threaded bores 412 formed in a positioning flange 414. An end face 416 of each cap screw 410 is driven into engagement with a face 418 of a receptive flange 420. Split sleeve 402 is drawn through bearing inner ring 406 to drive tapered outer surface 404 into contact with tapered surface 408 and collapse split sleeve 402, creating a lock to the bearing.

For bearing removal, cap screws 410 are removed from threaded bores 412 and placed within throughbores 422 formed in positioning flange 414. Cap screws 410 are engaged with threaded bores 424 formed in receptive flange 420. Rotation of cap screws 410 causes positioning flange 414 to move toward receptive flange 420. Previously contacting tapered surfaces 404, 408 disengage from one another and split sleeve 402 disengages the shaft.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A mechanism for locking a bearing to a shaft, comprising:
   a split sleeve;
   a receptive flange adapted to be axially fixed to the bearing;
   a positioning flange coupled to said split sleeve; and
   a screw extending through at least a portion of said positioning flange and said receptive flange, said screw threadingly engaging one of said positioning flange and said receptive flange, wherein rotation of said screw in a first direction drives axial displacement of said positioning flange and said split sleeve axially toward said receptive flange and axially drives said sleeve into engagement with the bearing to collapse said split sleeve into engagement with the shaft and rotation of said screw in a second direction opposite said first direction applies a driving force that drives axial displacement of said positioning flange and said split sleeve axially outward from said receptive flange.

2. The locking mechanism of claim 1 wherein said screw is captured within a pocket formed in the other of said positioning flange and said receptive flange, wherein rotation of said screw in said second direction disengages said sleeve from the bearing and the shaft.

3. The locking mechanism of claim 2 wherein said pocket radially inwardly extends from an outer circumferential surface of the other of said positioning flange and said receptive flange.

4. The locking mechanism of claim 3 further including additional pockets formed in the other of said positioning flange and said receptive flange, said pockets being circumferentially spaced apart from one another, said additional pockets being in receipt of additional screws.

5. The locking mechanism of claim 3 wherein said positioning flange includes an end face including an aperture extending therethrough to allow a tool to pass through the aperture to drivingly engage the screw.

6. A mechanism for locking a bearing to a shaft, comprising:
    a split sleeve;
    a receptive flange adapted to be axially fixed to the bearing;
    a positioning flange coupled to said split sleeve; and
    a screw extending through at least a portion of said positioning flange and said receptive flange, said screw threadingly engaging one of said positioning flange and said receptive flange, wherein rotation of said screw in a first direction drives axial displacement of said positioning flange and said split sleeve axially toward said receptive flange and axially drives said sleeve into engagement with the bearing to collapse said split sleeve into engagement with the shaft and rotation of said screw in a second direction opposite said first direction drives axial displacement of said positioning flange and said split sleeve axially outward from said receptive flange, said screw is captured within a pocket formed in the other of said positioning flange and said receptive flange, wherein rotation of said screw in said second direction disengages said sleeve from the bearing and the shaft,
    the receptive flange includes a recess in receipt of said positioning flange to substantially concentrically align the receptive flange and the positioning flange.

7. The locking mechanism of claim 6 wherein said screw extends within said recess and a portion of said receptive flange forming said recess at least partially isolates said screw and said pocket from contamination.

8. A mechanism for locking a bearing to a shaft, comprising:
    a split sleeve;
    a receptive flange adapted to be axially fixed to the bearing;
    a positioning flange coupled to said split sleeve; and
    a screw extending through at least a portion of said positioning flange and said receptive flange, said screw threadingly engaging one of said positioning flange and said receptive flange, wherein rotation of said screw in a first direction drives axial displacement of said positioning flange and said split sleeve axially toward said receptive flange and axially drives said sleeve into engagement with the bearing to collapse said split sleeve into engagement with the shaft and rotation of said screw in a second direction opposite said first direction drives axial displacement of said positioning flange and said split sleeve axially outward from said receptive flange,
    the split sleeve includes an external thread terminating at a shoulder, said positioning flange being threadingly engaged with said split sleeve to engage said shoulder.

9. The locking mechanism of claim 1 wherein said positioning flange and said split sleeve are axially translated substantially without rotation during rotation of said screw in said first direction.

10. The locking mechanism of claim 1 wherein said split sleeve is adapted to be collapsed about the shaft and released from engagement with the shaft through access to said screw from one end of said split sleeve.

11. The locking mechanism of claim 1 wherein said receptive flange includes a ring groove in receipt of a retainer adapted to couple said receptive flange to said bearing.

12. The locking mechanism of claim 1 wherein the split sleeve includes a portion having a tapered outer surface such that axial translation of the split sleeve relative to the bearing reduces an inner diameter of the split sleeve.

13. The locking mechanism of claim 1 wherein said split sleeve is constructed from a resilient material and defines a first inner diameter in a free state and defines a reduced inner diameter in an engaged state.

14. The locking mechanism of claim 1 wherein said screw includes an enlarged head drivingly engageable with an end face of the other of said positioning flange and said receptive flange.

* * * * *